United States Patent
Erb (10) Patent No.: US 10,530,745 B2
(45) Date of Patent: Jan. 7, 2020

(54) NETWORK ADDRESS AND HOSTNAME MAPPING IN POLICY SERVICE

(71) Applicant: Netsweeper (Barbados) Inc., St. Michael (BB)

(72) Inventor: Jeremy Erb, Guelph (CA)

(73) Assignee: Netsweeper (Barbados) Inc., St. Michael (BB)

( * ) Notice: Subject to any disclaimer, the term of this patent is extended or adjusted under 35 U.S.C. 154(b) by 319 days.

(21) Appl. No.: 14/428,742

(22) PCT Filed: Sep. 17, 2012

(86) PCT No.: PCT/CA2012/000823
§ 371 (c)(1),
(2) Date: Mar. 17, 2015

(87) PCT Pub. No.: WO2014/040160
PCT Pub. Date: Mar. 20, 2014

(65) Prior Publication Data
US 2015/0271132 A1  Sep. 24, 2015

(51) Int. Cl.
*G06F 15/173* (2006.01)
*H04L 29/12* (2006.01)
(Continued)

(52) U.S. Cl.
CPC ........ *H04L 61/2076* (2013.01); *H04L 47/803* (2013.01); *H04L 67/10* (2013.01)

(58) Field of Classification Search
CPC .............. H04L 61/2076; H04L 47/803; H04L 61/1511; H04L 61/6009; H04L 67/10; H04L 63/20
(Continued)

(56) References Cited

U.S. PATENT DOCUMENTS 6,256,671 B1 * 7/2001 Strentzsch .............. G06F 21/00 709/227
7,231,661 B1 * 6/2007 Villavicencio .......... G06F 21/41 709/225
(Continued)

FOREIGN PATENT DOCUMENTS

| WO | 03/001324 | 1/2003 |
| WO | 2009/117733 | 9/2009 |

(Continued)

OTHER PUBLICATIONS

European Search Report for corresponding European Application No. EP 12884367 dated Mar. 16, 2016.
(Continued)

*Primary Examiner* — John B Walsh
(74) *Attorney, Agent, or Firm* — Gardner, Linn, Burkhart & Ondersma LLP (57) ABSTRACT

A policy service enforces network policy for clients and servers of a computer network. The servers are accessible to the clients by way of hostnames and network addresses. Hostnames are stored in association with network addresses and update information. The update information indicates a priority with which to update a particular network address of a particular host. Such updates can be made using forward domain name system (DNS) resolutions. A subset of the hosts is prioritized for update based on the update information. A predictive process can be used to define the prioritized subset of hosts. The network addresses of the prioritized subset of hosts can then be updated before other network addresses of other hosts are updated. The association of hostnames and network addresses can be converted into a routing table, which can be loaded onto a router of the network.

22 Claims, 8 Drawing Sheets

HOSTNAME AND NETWORK ADDRESS MAPPING CACHE
22

| ID 24 | HOSTNAME 26 | NETWORK ADDRESS 28 | UPDATE INFO 30 |
|---|---|---|---|
| 1 | http://www.badsite.com | 174.137.125.43 | 1 |
| 2 | https://zombo.com | 69.16.230.117 | 2 |
| 3 | https://zombo.com | 69.16.231.119 | 2 |
| 4 | ftp://ftp.yarnsupply.com | 98.136.92.200 | 3 |
| 5 | http://www.yarnsupply.com | 68.142.205.137 | 50 |
| 6 | http://eff.org | 69.50.232.52 | 8 |
| 7 | http://slashdot.org | 69.50.232.52 | 6 |
| ... | ... | ... | ... |
| M | https://pugilism.com | 69.48.214.163 | 4 |

(51) Int. Cl.
    *H04L 12/927*    (2013.01)
    *H04L 29/08*    (2006.01)
(58) Field of Classification Search
    USPC .......................................................... 709/223
    See application file for complete search history.

(56) References Cited

U.S. PATENT DOCUMENTS

| | | | | |
|---|---|---|---|---|
| 7,954,144 | B1* | 5/2011 | Ebrahimi | H04L 63/102 709/227 |
| 7,958,258 | B2 | 6/2011 | Yeung et al. | |
| 8,621,556 | B1* | 12/2013 | Bharali | H04L 61/1511 726/1 |
| 2002/0010798 | A1* | 1/2002 | Ben-Shaul | H04L 29/12066 709/247 |
| 2003/0115246 | A1* | 6/2003 | Mahon | H04L 29/12216 709/200 |
| 2004/0215823 | A1* | 10/2004 | Kleinfelter | H04L 29/12066 709/245 |
| 2005/0144297 | A1* | 6/2005 | Dahlstrom | H04L 63/101 709/229 |
| 2008/0215718 | A1* | 9/2008 | Stolorz | H04L 61/1511 709/223 |
| 2010/0030914 | A1* | 2/2010 | Sparks | H04L 29/12066 709/235 |
| 2010/0088398 | A1* | 4/2010 | Plamondon | H04L 67/28 709/220 |
| 2010/0131646 | A1* | 5/2010 | Drako | H04L 29/12066 709/225 |
| 2010/0198911 | A1* | 8/2010 | Zhang | H04L 67/146 709/203 |
| 2010/0257258 | A1* | 10/2010 | Liu | H04L 29/12066 709/220 |
| 2010/0281146 | A1* | 11/2010 | Lee | H04L 29/12066 709/221 |
| 2010/0313264 | A1* | 12/2010 | Xie | H04L 63/101 726/22 |
| 2011/0060838 | A1* | 3/2011 | Yeung | H04L 29/12066 709/228 |
| 2011/0103384 | A1* | 5/2011 | Hackbart | H04L 29/12066 370/392 |
| 2011/0153867 | A1* | 6/2011 | van de Ven | H04L 29/12811 709/245 |
| 2011/0173683 | A1* | 7/2011 | Roach | H04L 63/20 726/4 |
| 2011/0231443 | A1* | 9/2011 | Hannel | H04L 63/105 707/776 |
| 2012/0084852 | A1* | 4/2012 | Ong | G06F 21/51 726/12 |
| 2012/0179801 | A1* | 7/2012 | Luna | H04L 61/1511 709/223 |
| 2015/0271132 | A1 | 9/2015 | Erb | |

FOREIGN PATENT DOCUMENTS

| | | |
|---|---|---|
| WO | 2011/004258 | 1/2011 |
| WO | 2011/123812 | 10/2011 |

OTHER PUBLICATIONS

CIPO Examination Report dated Jul. 26, 2018 corresponding to Canadian Application No. 2885087.
International Preliminary Report on Patentability dated Mar. 17, 2015 corresponding to International Patent Application No. PCT/CA2012/000823.
Extended European Search Report dated Feb. 4, 2016 for European Patent Application No. 12882523.9.
Extended European Search Report dated Dec. 16, 2015 for European Patent Application No. 13797896.1.
International Search Report and Written Opinion for corresponding PCT Application No. PCT/CA2012/000823 dated May 8, 2013.
Chesire, S. et al., "Dynamic DNS Update Leases", Internet-Draft, Standards Track, Aug. 10, 2006, http://tools.ietf.org/html/draft-sekar-dns-ul-01.

* cited by examiner

POLICY DATABASE
12

| ID 14 | HOSTNAME 16 | CATEGORY 18 | POLICY 20 |
|---|---|---|---|
| 1 | http://www.badsite.com | Pornography | DENY |
| 2 | https://zombo.com | Business | ALLOW |
| 3 | ftp://ftp.yarnsupply.com | Leisure | ALLOW |
| 4 | http://www.yarnsupply.com | Leisure | ALLOW |
| 5 | eff.org | News | DENY |
| 6 | http://slashdot.org | News | DENY |
| ... | ... | ... | ... |
| N | https://pugilism.com | Violence | DENY |

Fig. 1

HOSTNAME AND NETWORK ADDRESS MAPPING CACHE
22

| ID 24 | HOSTNAME 26 | NETWORK ADDRESS 28 | UPDATE INFO 30 |
|---|---|---|---|
| 1 | http://www.badsite.com | 174.137.125.43 | 1 |
| 2 | https://zombo.com | 69.16.230.117 | 2 |
| 3 | https://zombo.com | 69.16.231.119 | 2 |
| 4 | ftp://ftp.yarnsupply.com | 98.136.92.200 | 3 |
| 5 | http://www.yarnsupply.com | 68.142.205.137 | 50 |
| 6 | http://eff.org | 69.50.232.52 | 8 |
| 7 | http://slashdot.org | 69.50.232.52 | 6 |
| ... | ... | ... | ... |
| M | https://pugilism.com | 69.48.214.163 | 4 |

NETWORK ADDRESS AND HOSTNAME MAPPING IN POLICY SERVICE

FIELD

This disclosure relates to computer networks and, more specifically, to policy services in computer networks.

BACKGROUND

Policy services are used to deny or allow access to content or other data on a computer network. Policy services are also used to filter such content. It is common for policy services to be used to prevent users of client computers, such as children, from accessing material that is unsuitable for them.

However, access to content or other data can be initiated in a number of ways. When a domain name or other hostname is used, policy services can enforce stored policies based on the domain name or hostname. When a network address, such as an Internet protocol (IP) address, is used to access such content, it can be more difficult to consistently enforce policy, since the mapping of network addresses to hostnames may change over time. In fact, some hostnames change network addresses quite frequently, such as several times a day.

If the mapping of network addresses to hostnames is inaccurate, then there are times when policy is inadvertently enforced on benign content or not enforced on content intended to be blocked or filtered.

SUMMARY

A policy service enforces network policy for clients and servers of a computer network. The servers can be accessible to the clients by way of hostnames and network addresses. Storing an association of hostnames and network addresses can allow for policy based on hostname to be enforced on network address-based requests to servers. The association of hostnames and network addresses can be kept updated by prioritizing updates for hosts that more frequently change network address.

BRIEF DESCRIPTION OF THE DRAWINGS

The drawings illustrate, by way of example only, embodiments of the present disclosure.

DETAILED DESCRIPTION

Network policy services can be used to filter content or other data, deny access to content or other data, and reroute requests for content or other data. Such policy services can be used for various reasons, such as to prevent children from accessing adult-oriented websites.

Network policy services can benefit from mapping hypertext transfer protocol (HTTP) and HTTP secure (HTTPS) requests made to specific network addresses (e.g., "https://69.16.230.117") back to hostnames associated with the specific network addresses, particularly when policy is based on hostname. This allows improved performance of the policy service in a number of cases. In one case, HTTPS policies can be improved when server name information is not available and the request to the policy service contains an IP address. In another case, the possibility of a client using an IP address to bypass policy associated with a hostname is reduced. Further, in another case, the need for the policy service to have multiple data records for the same host, where such multiple data records identify different IP addresses, can be reduced or eliminated.

Requests to a policy service to deny, filter, or allow access to a host typically include a hostname or network address to which a client computer requests access. A hostname is commonly used when a user of the client computer specifies a website by, for example, typing in a domain name (e.g., "www.zombo.com") or clicking a link formed by a uniform resource locator (URL) with such domain name. A network address, such as an IP address, is sometimes used when the request is made in a protocol other than HTTP, in which case the policy service may not be able to readily obtain a hostname, as can happen, for example, when HTTPS is used and server name information is not present. In other instances, a user may type a URL or click a link containing an IP addresses, which is then included in the request.

A policy service may have difficulty enforcing policy when requests contain network addresses instead of hostnames. For example, relationships between IP addresses and hostnames often change, so that a policy based on hostname may not be enforced on a request using IP address. It is therefore advantageous to keep an accurate mapping of hostnames and network addresses, so that a network address can be translated into a hostname to determine policy.

Figure 1:
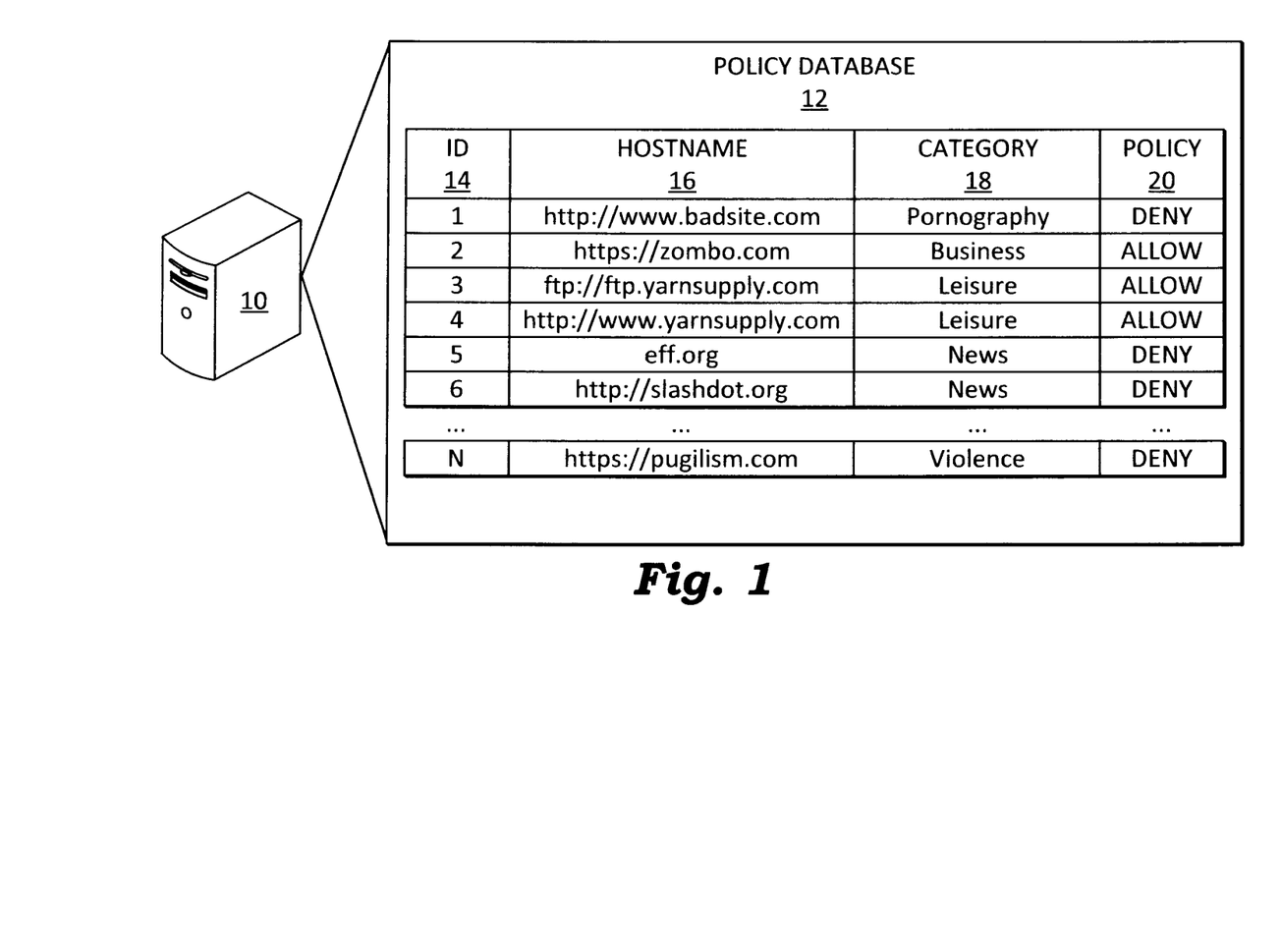
FIG. 1 is a schematic diagram of a policy server storing a policy database.

FIG. 1 shows a policy service having one or more policy servers 10 storing a policy database 12. The policy database 12 stores hostnames and policy related information. The policy database 12 can be used to implement network content policy and may be known as a blacklist, whitelist, or combination of such.

In this embodiment, each data record of the policy database 12 includes data fields configured to store a unique identifier or ID 14, a hostname 16, a category 18, and a policy 20. In other embodiments, additional information may be included.

The ID 14 uniquely identifies one data record in the policy database 12. The ID 14 may be a database key or other unique identifier. In the example shown in FIG. 1, the ID 14 is an integer that runs from 1 to N to uniquely identify a plurality of policies for a plurality of hosts.

Hostname 16 is a text string containing the name of the host server or other computer. Hostnames 16 can include domain names and fully qualified domain names including protocol, such as those illustrated, and may also include other name formats. The policy service can be configured to enforce policy on all protocols and/or subdomains when such are omitted from the hostname 16. That is, in this embodiment, the policy service interprets the hostname "eff.org" to also refer to hosts at subdomains such as "www.eff.org" and "mail.eff.org" as well as to different protocols (e.g., FTP, HTTP, etc).

Category 18 is a text string describing the general nature of the content at the host. Category 18 can be used to apply blanket policies based on subject matter.

Policy 20 is an indication of how the policy service handles requests to the host. In this example, polices are text indicators "DENY" and "ALLOW", indicating that requests are either denied or allowed. In other examples, the policy service can handle request in different ways, with such being reflected in the policy 20 field. In this embodiment, there is a one-to-one mapping of policy 20 to hostname 16.

When a request is made to a hostname 16, the policy service looks up the hostname 16 in the policy database 12 to determine how the request should be processed, for example, if the request should be allowed or denied. Denying requests can be achieved by either preventing requests from reaching the host or by preventing the requested content or other data from reaching the requesting client.

Hosts can be added and removed from the policy database 12 by an administrator using a user interface or by other techniques.

Figure 2:
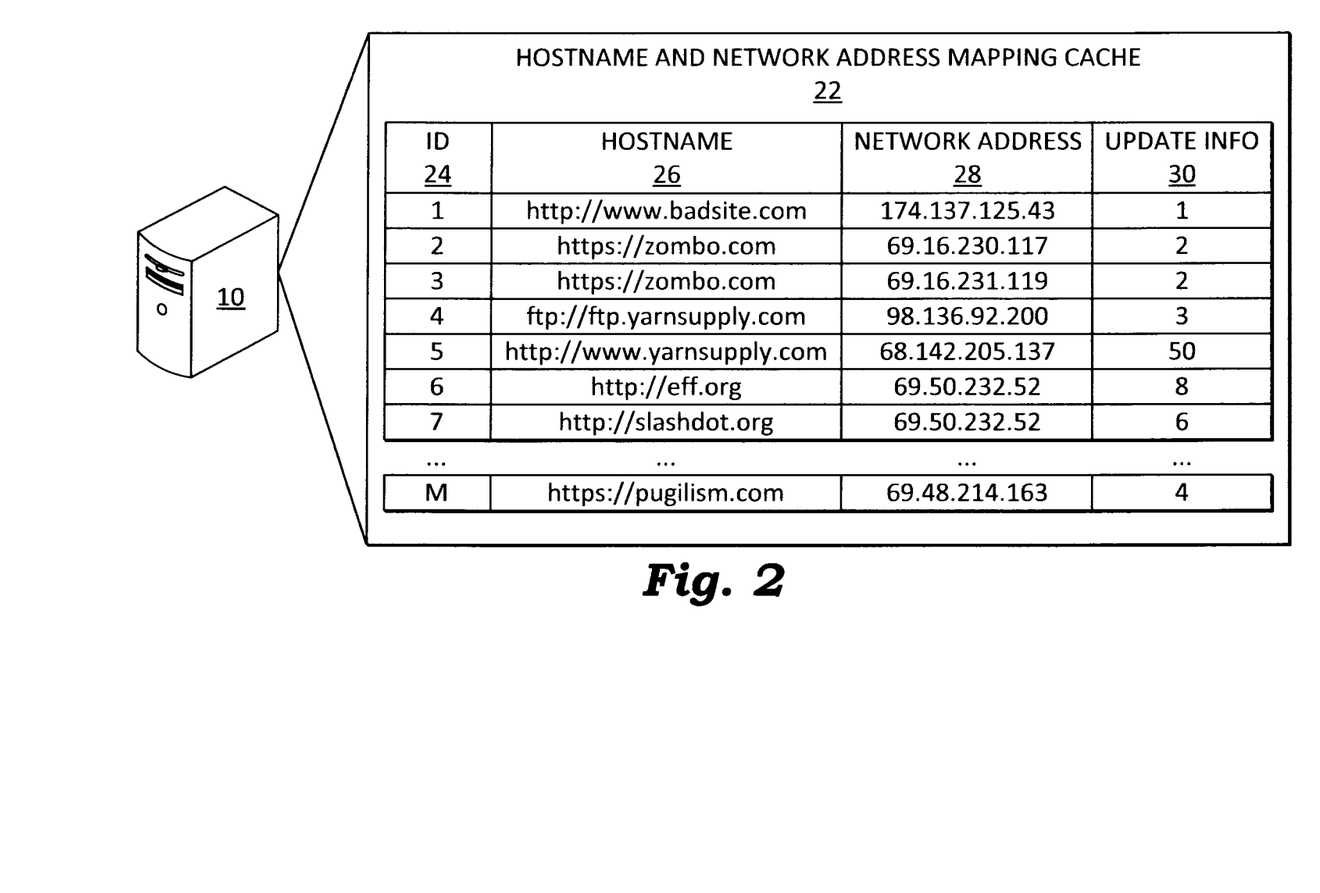
FIG. 2 is a schematic diagram of a policy server storing an association of network addresses and hostnames.

FIG. 2 shows the one or more policy servers 10 storing a hostname and network address mapping cache 22. The mapping cache 22 stores network addresses in relationship to hostnames. In this embodiment, the mapping cache 22 can be represented as a list or table. In other embodiments, the mapping cache can be several database tables that are related by local and foreign keys. The mapping cache 22 can be stored as a radix tree.

The mapping cache 22 can be populated from a variety of sources including, for example, a file system or a policy service user interface. For example, data records can be added or removed by a policy administrator. Data records added to the mapping cache 22 can be added based on policy transactions. For example, if a client is denied access to a particular host for any reason, then the host can be added to the mapping cache 22.

A domain name system (DNS) can also be used to populate the mapping cache 22. Adding a hostname to the mapping cache 22 can include performing a forward DNS resolution to obtain IP addresses associated with the hostname. Adding an IP address to the mapping cache 22 can include performing a reverse DNS lookup to obtain the associated hostname.

In this embodiment, each data record of the mapping cache 22 includes data fields configured to store a unique identifier or ID 24, a hostname 26, a network address 28, and update information 30. In other embodiments, additional information may be included.

The ID 24 uniquely identifies one data record mapping a hostname to a network address. The ID 24 may be a database key or other unique identifier. In the example shown in FIG. 2, the ID 24 is an integer that runs from 1 to M to uniquely identify a plurality of hostname to network address relationships.

The hostname 26 is a text string containing the name of the host server or other computer. Hostnames 26 can include domain names and fully qualified domain names including protocol, such as those illustrated, and may also include other name formats. A hostname 26 can be used as a key to lookup the associated policy for the host in the policy database 12. For example, the hostname 16 "http://www-.badsite.com" in the mapping cache 22 can be used to lookup the policy 20 in the policy database 12, which in this case denies access to the host. Keys other than hostname, such as numeric keys, can alternatively be used.

The network address 28 is a value that permits network connection to the host server or computer of the given hostname. In this example, the network address 28 is an IPv4 IP address. However, other kinds of network assesses may be used, such as IPv6 IP addresses and media access control (MAC) addresses.

As shown, each data record of the mapping cache 22 maps a network address to a hostname. This relationship accommodates many-to-many mappings. For example, data records with IDs of "1" and "N" are each one-to-one mappings of hostname to IP address. Data records with IDs "2" and "3" are a one-to-many mapping of the same hostname to different IP addresses. Data records with IDs "4" and "5" are two one-to-one mappings of different protocols at the same domain to different IP addresses. Data records with IDs "6" and "7" represent a many-to-one mapping of different hostnames to the same IP address.

In use, when a request to connect to a hostname is made by a client, the policy server 10 looks up the requested hostname 16 in the policy database 12 and enforces the associated policy. However, when a request to connect to an IP address is made by a client to the policy server 10, the policy server 10 first references the mapping cache 22 to resolve the hostname 26 for the IP address 28 before using the policy database 12 to determined the associated policy. If no data record exists in the mapping cache 22 for the requested IP address 28, then the policy server 10 can initiate a reverse DNS lookup to obtain a hostname 26 for the IP address 28 and add a corresponding data record to the mapping cache 22.

Using the mapping cache 22 saves time over performing DNS lookups each time an IP address is included in a request. Reverse DNS lookups may also be unreliable and inaccurate. It is also advantageous that, because the mapping cache 22 supports many-to-many relationships between hostname and network address, the policy database 12 need only have one data record for each hostname. This allows for more efficiency when specifying policy, in that policy can be independent of network address as well as protocol.

The relationship between hostnames and IP addresses is not permanent, as mentioned above, and thus the mapping cache 22 can be kept current as follows.

The update information 30 of the mapping cache 22 is a value that indicates a priority with which to update one or more particular network addresses 28 for a particular hostname 26 or vice versa. The update information 30 can be expressed as an integer, as shown, or another data type. The update information 30 can be one field, as shown, or a plurality of different fields, which can have different data types.

For each hostname-to-network address data record in the mapping cache 22, the update information 30 can indicate one or more of a period with which to update the data record, a frequency for updating the data record, a date or time by which to update the data record, a date or time of last request to the host, a date or time of last update to the data record, and a number of requests since the data record was last updated. In the example illustrated, the update information 30 represents periods for updating data records and is expressed in days. That is, the data record with ID "1" is updated once a day, the data record with ID "2" is updated once every two days, and so on. As will be discussed in further detail below, the update information is used in a predictive process to determine which data records of the mapping cache 22 to prioritize for update, so as to increase or maximize the total recency of the mapping cache 22.

Figure 3:
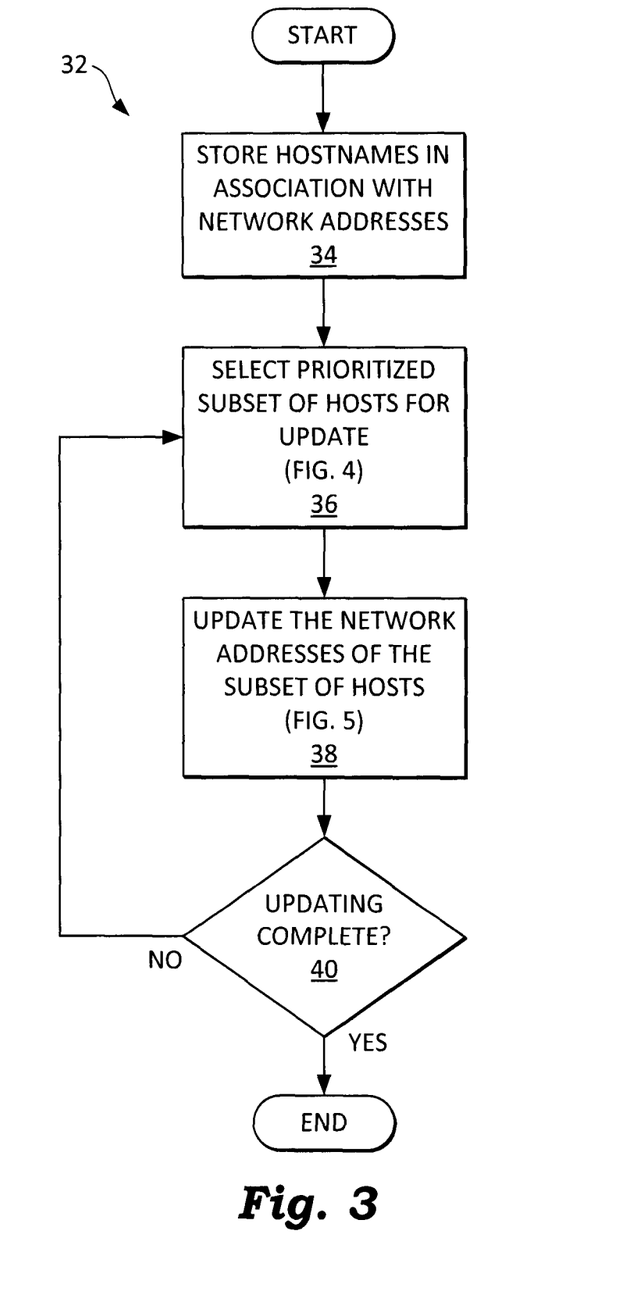
FIG. 3 is a flowchart of a process of updating the association of network addresses and hostnames.

FIG. 3 illustrates a process 32 for updating the mapping cache 22 of network addresses 28 and hostnames 26. While the process 32 will be discussed with reference to the mapping cache 22 and other components described elsewhere herein for sake of clarity, it should be understood that the process 32 can operate on and with different components.

Hostnames of a plurality of hosts are stored in association with network addresses and update information, at step 34. The mapping cache 22 described above can be used for this purpose along with update information 30 stored in the mapping cache 22. An initial association of hostnames and network addresses may be loaded onto a server 10 or servers of a policy service.

At step 36, a prioritized subset of the hosts is selected for update based on the update information 30. Prioritized hosts are those that are to have their hostname and network address associations updated before non-prioritized hosts. Non-prioritized hosts can be updated at a later time and/or by a different process. Alternatively, prioritizing the subset of hosts can include ranking hosts for update with the prioritized subset of hosts being the top ranked hostnames. The process 50 of FIG. 4 can be referenced for a detailed embodiment of step 36.

Prioritizing a subset of hosts allows for hosts that more frequently change their association of network addresses and hostnames to be updated more frequently, so as to predictively increase or maximize the total recency of the mapping cache 22. That is, hostnames that are associated with network addresses that have changed frequently in the past will have their network addresses checked and updated more frequently than hostnames that are associated with network addresses that change less frequently. In an illustrative example with reference to FIG. 2, the website "www.badsite.com" may be known to change network addresses every two or three days, and so may have update information 30 representative of a period of one day in order to catch such changes in a timely manner. In contrast, the website "www.yarnsupply.com" may have never changed its IP address and thus may require only low frequency checking and updating of its IP address 28, such as every 50 days. On the other hand, the FTP site at the same domain may have been flagged has having once hosted objectionable content and may thus be selected to have its IP address updated at a higher frequency, such as every three days.

Next, at step 38, the network addresses of the prioritized subset of the hostnames are updated. This can include performing forward DNS resolutions to obtain IP addresses for the subset of hostnames, in addition or alternative to other techniques, as will be discussed below with reference to FIG. 5. The mapping cache 22 can then be updated to contain the updated IP addresses. The updated information 30 of the updated hosts can also be updated to reflect that the network address has just been updated. For example, when the update information is configured to include a date, such as date of last/next update, then such date can be advanced. When the update information 30 is configured to include a number of requests since last update, then such number can be reset to zero. When, on the other hand, the update information 30 is configured to include a period or frequency with which to perform updates, then such value can be left unchanged.

The process 32 updates network addresses until all of the hostnames in the prioritized subset have had their network addresses updated and the process 32 ends, via step 40. The process 32 can then be repeated by referencing updated update information 30 in the mapping cache 22 to select a new prioritized subset of hosts. In practice, the process 32 may run continually or nearly continually, so that at any given time a subset of hosts is being updated.

In other embodiments, the order of the steps of the process 32 can be changed, each step can be separated into two or more different steps, or two or more steps can be integrated into a larger step.

Figure 4:
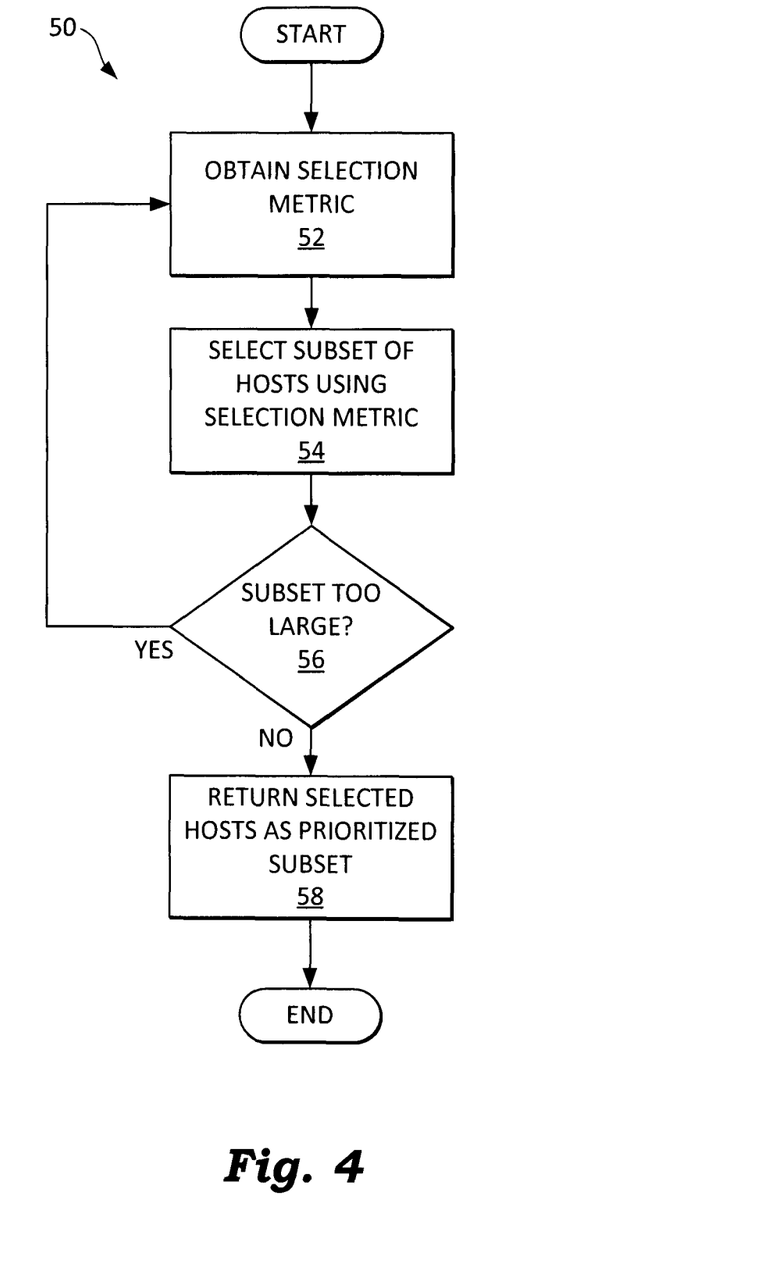
FIG. 4 is a flowchart of a process of selecting a subset of hosts for prioritized update.

FIG. 4 illustrates a process 50 for selecting a subset of hosts for prioritized updating of association of hostname and network address. While the process 50 will be discussed with reference to the mapping cache 22 and other components described elsewhere herein for sake of clarity, it should be understood that the process 50 can operate on and with different components.

At step 52, a selection metric is obtained for selecting hosts based on their update information 30, so that at step 54 a subset of hosts meeting the metric can be selected. Referring, for example, to the mapping cache 22 above, the update information 30 of a host data record is compared to the metric to determine whether the host is to have its hostname and network address association updated. If the update information 30 is configured as a date or time, then the metric is configured as a date or time. In one embodiment, the update information 30 is the date or time of last request to the host and the metric is defined as a certain number of days ago. Accordingly, step 54 selects all hosts that have had requests within that certain number (e.g., seven) of days. Thus, hosts that are more frequently accessed have their network address and hostname mapping more frequently updated. In another embodiment, the update information 30 is configured as a date or time since last update and a number of times that content has been requested from the host since the last update. The metric is accordingly selected to be threshold number of requests since the last update, such as 10,000 requests. Thus, hosts that meet a threshold volume of requests since the last update of the network address and hostname mapping have such mapping updated more frequently.

Obtaining the metric at step 52 can be performed by a server of a policy service accessing a file in which the metric is stored. The metric can be loaded onto one or more servers of the policy service and/or can be changed via a user interface of the server. Selecting the subset of hosts at step 54 can be realized by, for example, a query (e.g., an SQL query) at a database or other data structure that stores the association of hostnames, network addresses, and priority information.

Selecting the subset of hosts can be configured to be limited, at step 56, to return a limited number of hosts and even a single host. For example, each time the process 50 is performed, a single host can be selected for prioritized update. In another example, a limited number of hosts can be returned (e.g., the 1,000 hosts most in need of update). In still another example, no limit aside from the metric is used (e.g., an SQL query without a LIMIT condition).

When the subset of hosts selected according to the metric are within the configured limit, if any, the subset of hosts is returned as the subset of hosts prioritized for update.

In other embodiments, the order of the steps of the process 50 can be changed, each step can be separated into two or more different steps, or two or more steps can be integrated into a larger step.

Figure 5:
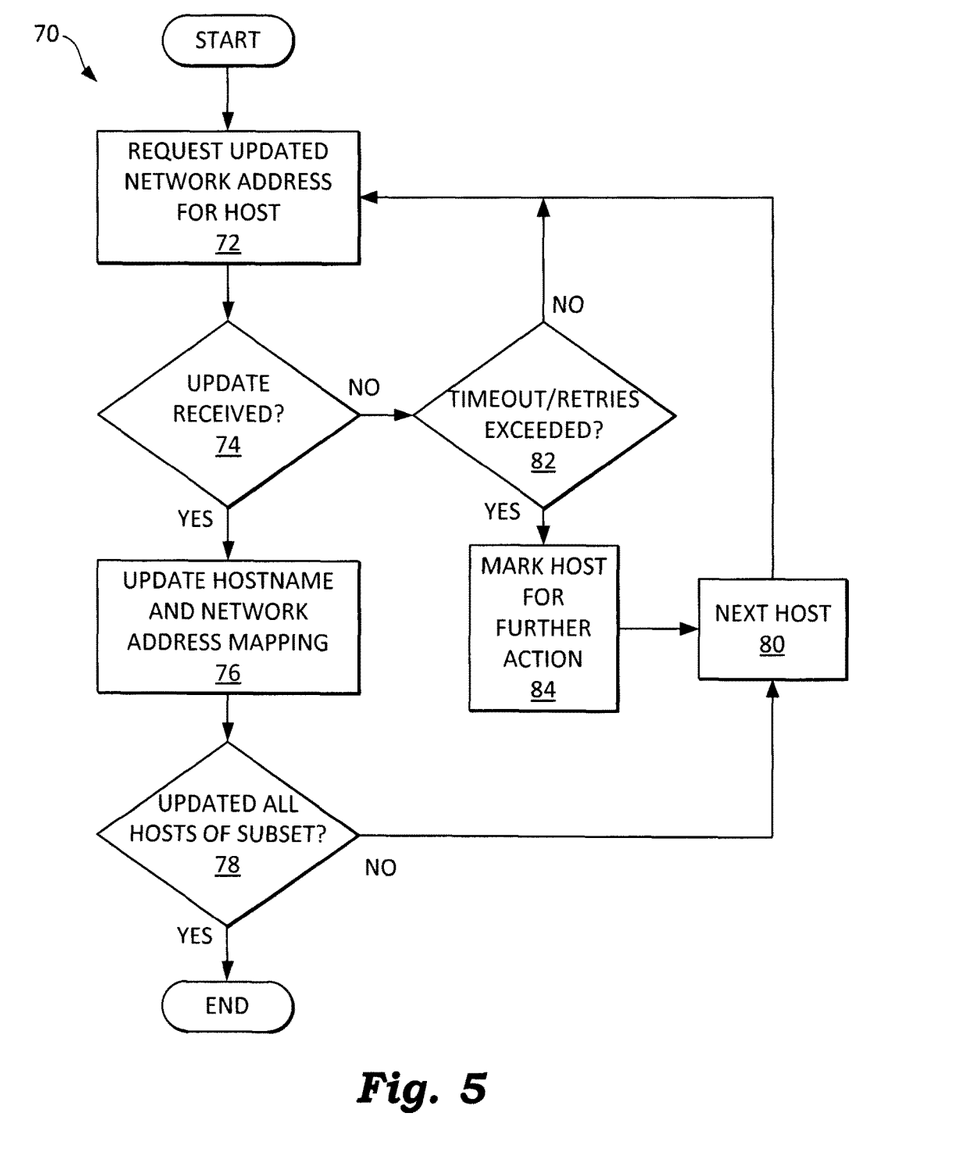
FIG. 5 is a flowchart of a process of updating the network addresses of the subset of hosts.

FIG. 5 illustrates a process for updating network addresses for a host, such as a host of the subset of hosts to undergo prioritized update. While the process 70 will be discussed with reference to the mapping cache 22 and other components described elsewhere herein for sake of clarity, it should be understood that the process 70 can operate on and with different components.

At step 72, a request is made to for one or more network addresses for a host based on a hostname of the host. In this embodiment, this is achieved by performing a forward DNS resolution for the hostname. For example, the policy service can request from a DNS server the network addresses associated with one or more of the hostnames being updated. Other techniques may be used in addition or alternatively to forward DNS resolutions.

When one or more network addresses are received, at step 74, in response to the request, then the association of hostname and network addresses is updated at step 76. This can involve, for example, when the mapping cache 22 is used, updating, deleting, or adding data records to the mapping cache 22. In one embodiment, data records received for a host under update are added to the mapping cache 22 and then any duplicate (i.e., redundant and identical) data records for the host are deleted. In another embodiment, data records of the mapping cache 22 for a host under update are deleted and replaced with data records received during the update.

The update information 30 can also be updated to reflect the update, as discussed above. Moreover, the update information 30 can be updated based on whether a network address has changed. That is, if the network address received at step 74 is the same as the network address already present in the mapping cache 22, then the update information can be changed to reduce the frequency at which future updates are performed. For example, when the update information 30 is configured to store a period of time that is to elapse before the next update is made, then such period can be increased if the most recent update did not determine a change in network address. Conversely, such period can be decreased if the most recent update did determine a change in network address. Consequently, the update information 30 can be fine-tuned over time to minimize the number of requests to check and update network addresses while maximizing the probability that the network addresses in the mapping cache 22 are accurate. The same predictive principle applies to other formats for the update information 30, such as date, frequency, number of requests, etc.

When all the hosts in the subset of prioritized hosts are updated, then the process 70 ends via step 78. Otherwise, the next host in the subset is selected, at step 80, and the process 70 is repeated to obtain network addresses for that host.

At steps 74 and 82, when an update is not received within a predetermined timeout or a predetermined number of retries, then, at step 82, the host whose information is being updated is marked for further action and the next host is selected for update, as step 80. Such further action can include one or more of using another DNS server, using another technique to obtain the network addresses for the host, removing the host from the subset of prioritized hosts and updating the host's update information 30 to reflect a lower priority for use the next time the subset is selected, and removing the host from the mapping cache 22. Such downgrading or pruning may be necessary as hosts go out of service.

In other embodiments, the order of the steps of the process 70 can be changed, each step can be separated into two or more different steps, or two or more steps can be integrated into a larger step.

Figure 6:
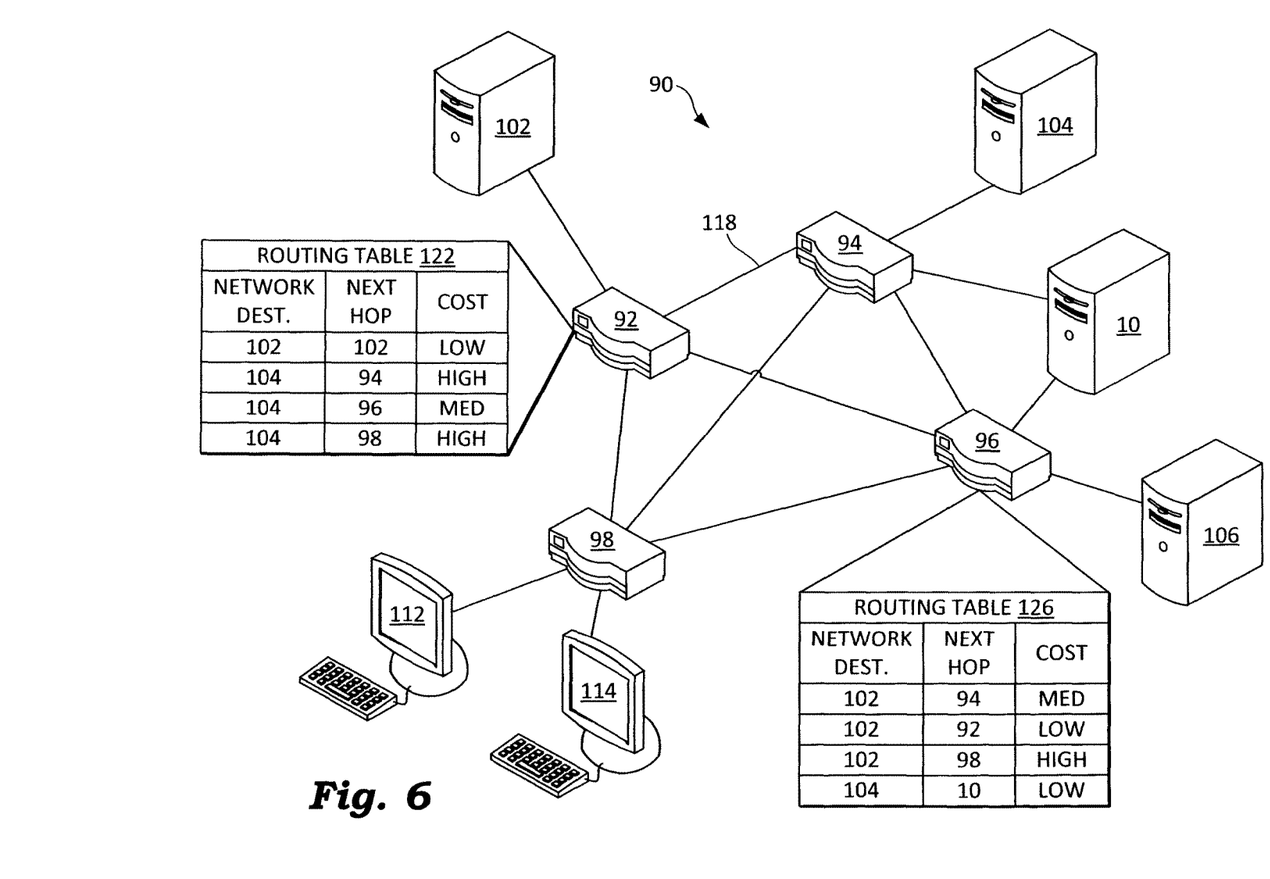
FIG. 6 is a schematic diagram of a network having the policy server.

FIG. 6 shows a schematic diagram of a computer network 90 in which the techniques described above can be used. The network 90 is a representation of an intranet or the Internet, though simplified for explanatory purposes.

The network 90 includes a plurality of routers 92, 94, 96, 98, servers 102, 104, 106, the policy server 10, and clients 112, 114 interconnected via communication links 118, according to the example network topography illustrated. In actual implementations, the number of routers 92-98, servers 102-106 and 10, and clients 112-114 can be higher (e.g., hundreds, thousands, millions, or more) and the configurations and purposes of the routers 92-98, servers 102-106 and 10, and clients 112-114 can be as specialized or as general as required. The communication links 118 can include typical network connections such as network cables, fiber-optic trunk lines, wireless links, and the like.

The routers 92-98 are configured to route data between the servers 102-106 and 10 and the clients 112-114. Each of the routers 92-98 may be configured to communicate with other routers 92-98 and the servers 102-106 and 10 according to one or more communications protocols, such as the border gateway protocol (BGP), transmission control protocol/Internet protocol (TCP/IP), and real-time transport protocol (RTP), among other examples. Each of the routers 92-98 may be known as or specifically configured to act as a router, gateway, network access point, or switch, to name a few examples. Each of the routers 92-98 can be addressed by at least one network address, such as an IP address. The routers 92-98 store information indicative of the topology of the network 90, such as routing tables, two of which are shown at 122 and 126.

The servers 102-106 are configured to store data for access and retrieval by one or more of the other servers 102-106 and clients 112-114. Each of the servers 102-106 may be known or specifically configured to act as a Web server, data server, file transfer protocol (FTP) server, application server, voice over IP (VOIP) server, or media server, to name a few examples. In this example, the server 106 is a DNS server, while the server 10 is a policy server of a policy service, as discussed above.

Each of the servers 102-106 and 10 are configured to communicate with one or more of the routers 92-98 according to one or more of the communications protocols mentioned above. Each of the servers 102-106 and 10 can be addressed by at least one network address, such as an IP address.

The clients 112-114 are configured for human access to the servers 102-106 and 10. Each of the clients 112-114 may be configured to communicate with the routers 92-98 according to one or more of the communications protocols mentioned above. Each of the clients 112-114 may be a personal computer, smart phone, tablet computer, laptop computer, netbook, or similar electronic device.

The network addresses of the servers 102-106 and 10 allow the servers to be accessible to the clients 112-114 via the routers 92-98. For example, when the client 112 requests data from the server 104, the client 112 provides the network address (e.g., an IP address, such as "174.137.125.43") of the server 104 to the network 90 which, in this example, is accessible to the client 112 via the router 98. Since the routers 92-98 store information indicative of the topology of the network 90, the router 98 is able to use the network address to initiate establishment of a route, via any of the other routers 92-96, for communication between the client 112 and the server 104.

The servers 102-106 and 10 can also be accessed by hostnames. For example, the server 104 may be accessible via the hostname "badsite.com". The client 112 may accordingly be provided with the hostname by, for example, a human user of the client 112, when data is to be requested from the server 104. However, the client 112 requires the network address of the server 104 to actually communicate with the server 104. Accordingly, the client 112 looks up the network address associated with the hostname by referencing a local DNS cache, querying the DNS server 106, or initiating a DNS query to be performed by another device on behalf of the client 112. The client 112 can thus request data from the server 104 using the server's network address, as discussed above.

As mentioned, communication between the servers 102-106 and 10 and clients 112-114 is facilitated by the routing tables 122, 126. Each of the routing tables 122, 126 can include fields identifying the next hop and associated cost for particular network destinations. In general, a network destination is the network address a given one of the servers 102-106 and 10 and an associated next hop is the network addresses of the next router 92-98 on a particular route to the given server 102-106, 10 or the network address of the given server 102-106, 10, if at the end of the route. The cost is an indication of the latency, speed, efficiency, or other metric of the particular route. The costs in the routing tables 122, 126 can facilitate least-cost routing of data between the servers 102-106 and 10 and clients 112-114. The costs discussed herein are expressed as low, medium ("med"), and high for the sake of explanation.

In the example routing table 122 stored in the router 92, for a network destination of server 102, the next hop is the server 102 itself and the associated cost is low. For a network destination of server 104, one next hop is the router 94 with an associated high cost and different next hop is the router 96 with an associated medium cost, and so on. The routers 94 and 98 have similar routing tables.

The router 96, on the other hand, has its routing table 126 configured to redirect requests for data from servers under the control of policy to the policy server 10. In this example, the server 104 is under policy. Accordingly, the routing table 126 lists a low cost for the server 104 as the network destination, but indicates the next hop to be the policy server 10 instead of the router 94, as would normally be expected. The router 96 can further be configured to advertize to other routers its low-cost route to the server 104, which results in a tendency for traffic to the server 104 being routed through the policy server 10.

Traffic on the network 90 sees the router 96 as providing a low-cost or even least-cost route to the server 104, thereby allowing policy for the server 104 to be enforced on the clients 112, 114. The policy server 10 can accordingly filter, deny, or allow requests by the clients 104 for content or other data from the server 104.

For example, suppose the user of the client 112 wishes to view a video stored on the server 104 and the policy server 10 stores a policy for the client 112 that forbids the client 112 from receiving media content from the server 104, since such content may be pornographic in nature and the client 112 has been configured to be used by children. The user of the client 112 types a hostname (or domain name) associated with the server 104, clicks a hyperlink identifying the video, enters a network address of the server, or undertakes a similar action to view the video. The client 112 then makes a request to the router 98 for a route to the server 104. If the router 98 suggests a route through the router 96, then the request will come under the control of the policy server 10 due to the router's 96 routing table 126 being configured to route requests for server 104 through the policy server 10. If, on the other hand, the router 98 suggests a route through the router 92, then the request should also come under the control of the policy server 10 due to the router's 92 routing table 122 reflecting the advertized low-cost route through the router 96 to the server 104. The policy server 10 can then deny the user's request to view the video or allow the request to reach the server 104 but block the returned content.

The routing table 126 referenced by the router 96 can be configured by the policy server 10. In one embodiment, this can be achieved by the policy server 10 converting the mapping cache 22 (FIG. 2) to a routing table and then loading the routing table into the router 96.

Figure 7:
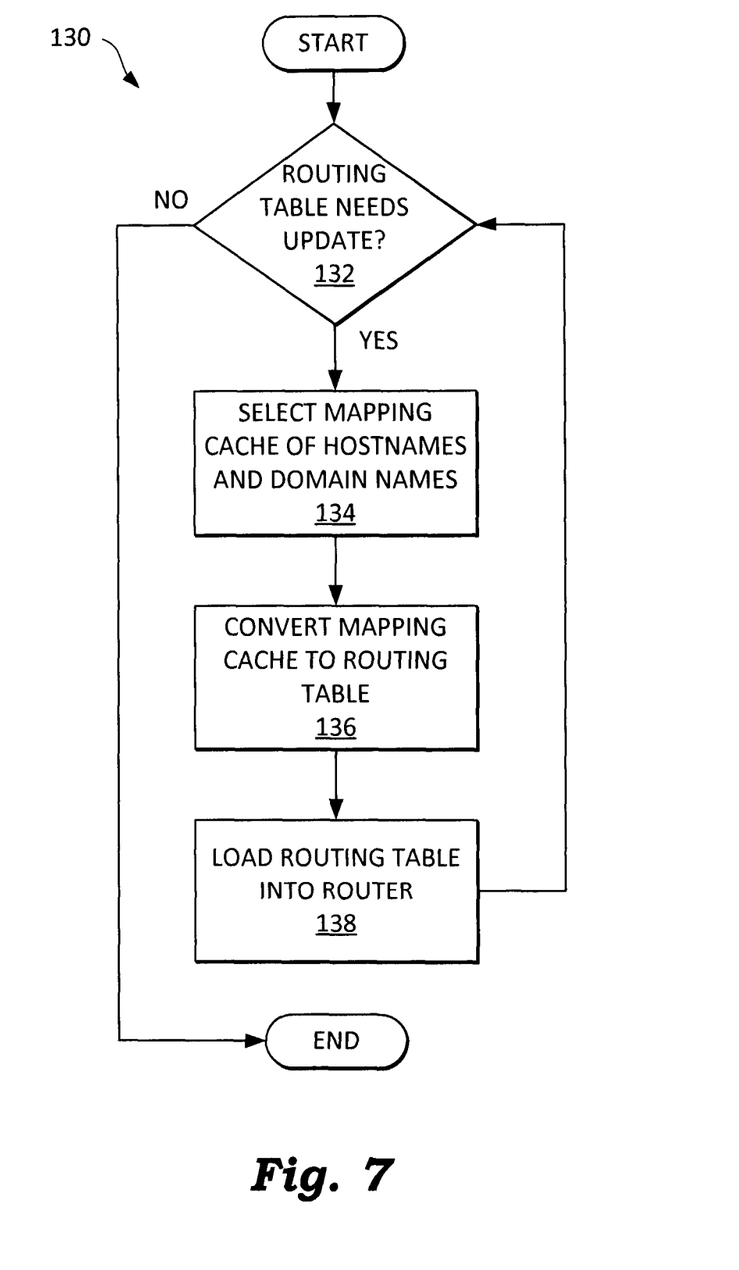
FIG. 7 is a flowchart of a process of using the association of network addresses and hostnames to update the routing table of a router.

FIG. 7 illustrates a process 130 of loading into a router a routing table generated from a mapping of hostnames and network addresses, such as the mapping cache 22. While the process 130 will be discussed with reference to the mapping cache 22 and network 90 as well as other components described elsewhere herein for sake of clarity, it should be understood that the process 130 can operate on and with different components.

At step 132, whether the routing table needs update is determined. The routing table can be updated periodically or based on a selected event, such as after the mapping cache 22 is updated. If the routing table is not in need of update, the process 130 ends and can be performed again later.

If, however, the routing table needs updating, at step 134, at least a portion of the mapping cache 22 is selected. The server 10 or another server of the policy service can select the portion of the mapping cache 22 that is to be loaded onto the router. The selected portion of the mapping cache 22 can be the entire mapping cache 22 or a partial portion of the mapping cache 22 recently updated, such as the portion of the mapping cache that corresponds to the prioritized subset of hosts.

Next, at step 136, the selected portion of the mapping cache is converted to a format suitable for use in a routing table. In this embodiment, converting includes dropping the update information 30 (FIG. 2) and dropping the ID 24 or resolving the ID 24 to an ID compatible with the routing table format used by the router. In other embodiments, converting can further include changing the format or data type of the hostname 26 and/or network address 28. Converting further includes selecting a next hop for each row of the routing table. To achieve this, the policy database 12 is referenced for the converted portion of the mapping cache 22 and hostnames to which access is to be denied are given a next hop that is a network address of a server within the policy service, such as the server 10, and an associated cost that is low. Hostnames to which access is to be allowed are left unchanged or are given a next hop of a router proximate to the host and an accurate or estimated cost.

After the selected portion of the mapping cache is converted, the converted portion of the mapping cache is loaded into the router at step 138. The policy server 10 or another server of the policy service can be configured to access the router and load the converted portion of the mapping cache 126 into the router.

In other embodiments, the order of the steps of the process 130 can be changed, each step can be separated into two or more different steps, or two or more steps can be integrated into a larger step.

Figure 8:
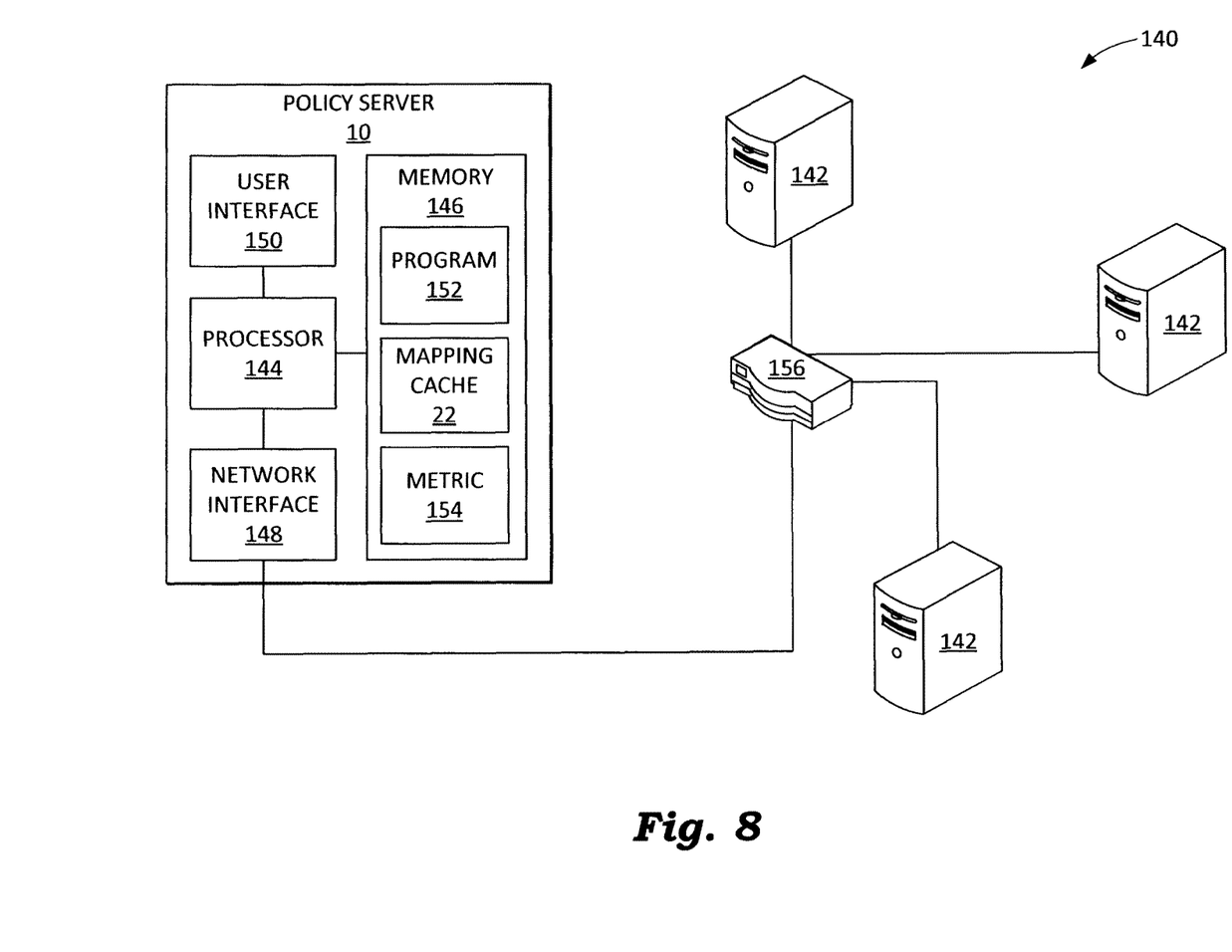
FIG. 8 is a schematic diagram of a policy service network system having the policy server.

FIG. 8 illustrates components of the policy server 10 as well as a network of similar or identical policy servers 142 that form a policy service network system 140.

The policy server 10 includes a processor 144, memory 146, a network interface 148, and can further include a user interface 150. The processor 144, memory 146, network interface 148, and user interface 150 are electrically interconnected and can be physically contained within a housing or frame.

The processor 144 is configured to execute instructions, which may originate from the memory 146 or network interface 148. The processor 144 may be known a central processing unit (CPU). The processor 146 can include one or more sub-processors or processing cores.

The memory 146 is a non-transitory computer-readable medium that is configured to store programs and data. The memory 146 can include one or more of a solid-state memory chip, a hard drive, optical storage medium, removable storage medium, and similar. The memory 146 allows for random access, in that programs and data may be both read and written.

The network interface 148 is configured to allow the server 10 to communicate with other computers across a network (e.g., network 90 of FIG. 6) and with other policy servers 142 of the policy service 140. The network interface 148 can include a network adaptor and well as a software or firmware driver for controlling such adaptor.

The user interface 150, if provided, can include a display device, such as a monitor, bank of light-emitting diodes (LEDs), or similar for monitoring operations of the server 10. The user interface can additionally or alternatively include an input device, such as a keyboard, mouse, touchscreen, or similar. The user interface 150 can be remote and provided through the network interface 148 to a client computer.

A program 152 is provided to the memory 146 for controlling operations of the server 10. The program 152 can include instructions or other code to implement one or more of the processes and techniques described herein. A portion of or the entire program 152 may be loaded into the memory 146 via the network interface 148 or via a portable nontransitory computer-readable medium, such as a memory card, optical disc, or similar.

The mapping cache 22 that stores associations between hostnames and network addresses, as described elsewhere herein, can also be stored in the memory 146. A portion of or the entire mapping cache 22 may be loaded into the memory 146 via the network interface 148 or via a portable non-transitory computer-readable medium, such as a memory card, optical disc, or similar. The program 152 can configure the mapping cache 22 to be editable via the user interface 150.

A metric 154, such as one or more of those described elsewhere herein, can also be stored in the memory 146. The metric 154 may be loaded into the memory 146 via the network interface 148 or via a portable non-transitory computer-readable medium, such as a memory card, optical disc, or similar. The program 152 can configure the metric 154 to be editable via the user interface 150.

The servers 142 can be the same as or similar to the server 10. The servers 142 and 10 are interconnected via one or more routers 156 or similar devices. The servers 142 and 10 can be situated a different geographic locations.

In one embodiment, the servers 142 include the same components as the server 10 and the same program 152 and a copy of the same mapping cache 22. This may be helpful for load balancing, failsafe redundancy, or to server different geographical areas. In another embodiment, the servers 142 and 10 are specialized and have programs 152 providing different functionality (e.g., each executing different processes of those described herein), and fewer than all of the servers 142 and 10 (e.g., one or two) store a copy of the mapping cache 22. For example, the server 10 may be configured to store the mapping cache 22 and convert and load a routing table, while one of the servers 142 may be configured to update the mapping cache by performing forward DNS resolutions. Specialized servers 142 and 10 can improve the efficiency of the policy service. In still another embodiment, a single server 10 is used.

While the foregoing provides certain non-limiting example embodiments, it should be understood that combinations, subsets, and variations of the foregoing are contemplated. The monopoly sought is defined by the claims.

What is claimed is:

1. A process comprising:
   storing a mapping cache containing hostname-to-network address data records including hostnames of hosts in association with network addresses and update information, particular update information associated with a particular hostname and a particular network address indicating a priority with which to update the particular network address;
   adding new hostname-to-network address data records, including respective hostnames and network addresses, to the mapping cache based on policy transactions of a policy service capable of enforcing policy based on requested host, the adding including:
      adding a particular hostname to the mapping cache, and associating the particular hostname with a respective network address, if a client of the policy service is denied access to the particular hostname; and
      adding a particular network address to the mapping cache, and associating the particular network address with a respective hostname, if a client of the policy service is denied access to the particular network address;
   prioritizing a subset of the hosts for update based on the update information;
   updating the network addresses of the subset of the hosts; and
   using the mapping cache to enforce policy.

2. The process of claim 1, wherein prioritizing the subset of the hosts for update is performed according to a predictive process.

3. The process of claim 2, wherein the predictive process is configured to select the subset of the hosts based on frequency of change of network addresses of the hosts.

4. The process of claim 1, wherein updating the network addresses of the subset of the hosts comprises initiating forward domain name system resolutions to obtain network addresses for the hostnames of the subset of hosts.

5. The process of claim 1, further comprising enforcing policy based on a particular hostname to filter data between a client and a server at one of the network addresses associated with the particular hostname.

6. The process of claim 1, further comprising enforcing policy based on a particular hostname to deny a client access to data at one of the network addresses associated with the particular hostname.

7. The process of claim 1, further comprising:
   converting at least a portion of the mapping cache into at least a portion of a routing table; and
   loading the portion of the routing table into a router.

8. A network system comprising:
   one or more servers comprising a memory and a processor configured to:
      store a mapping cache containing hostname-to-network address data records including hostnames of hosts in association with network addresses and update information, particular update information associated with a particular hostname and a particular network address indicating a priority with which to update the particular network address;

add new hostname-to-network address data records, including respective hostnames and network addresses, to the mapping cache based on policy transactions of a policy service capable of enforcing policy based on requested host, the adding including:
  adding a particular hostname to the mapping cache, and associating the particular hostname with a respective network address, if a client of the policy service is denied access to the particular hostname; and
  adding a particular network address to the mapping cache, and associating the particular network address with a respective hostname, if a client of the policy service is denied access to the particular network address;
prioritize a subset of the hosts for update based on the update information;
update the network addresses of the subset of the hosts; and
use the mapping cache to enforce policy.

9. The system of claim 8, wherein the one or more servers is configured to prioritize the subset of the hosts for update according to a predictive process.

10. The system of claim 9, wherein the predictive process is configured to select the subset of the hosts based on frequency of change of network addresses of the hosts.

11. The system of claim 8, wherein the one or more servers is configured to update the network addresses of the subset of the hosts by initiating forward domain name system resolutions to obtain network addresses for the hostnames of the subset of hosts.

12. The system of claim 8, wherein the one or more servers is configured to enforce policy based on a particular hostname to filter data between a client and a server at one of the network addresses associated with the particular hostname.

13. The system of claim 8, wherein the one or more servers is configured to enforce policy based on a particular hostname to deny a client access to data at one of the network addresses associated with the particular hostname.

14. The system of claim 8 further comprising at least one router connected to at least one of the one or more servers, the one or more servers further configured to:
  convert at least a portion of the mapping cache into at least a portion of a routing table; and
  load the portion of the routing table into the router.

15. A non-transitory computer-readable medium containing instructions that, when executed by a processor:
  store a mapping cache containing hostname-to-network address data records including hostnames of hosts in association with network addresses and update information, particular update information associated with a particular hostname and a particular network address indicating a priority with which to update the particular network address;
  add new hostname-to-network address data records, including respective hostnames and network addresses, to the mapping cache based on policy transactions of a policy service capable of enforcing policy based on requested host, the adding including:
    adding a particular hostname to the mapping cache, and associating the particular hostname with a respective network address, if a client of the policy service is denied access to the particular hostname; and
    adding a particular network address to the mapping cache, and associating the particular network address with a respective hostname, if a client of the policy service is denied access to the particular network address;
  prioritize a subset of the hosts for update based on the update information;
  update the network addresses of the subset of the hosts; and
  use the mapping cache to enforce policy.

16. The non-transitory computer-readable medium of claim 15 further containing instructions that, when executed by the processor, prioritize the subset of the hosts for update is performed according to a predictive process.

17. The non-transitory computer-readable medium of claim 16, wherein the predictive process is configured to select the subset of the hosts based on frequency of change of network addresses of the hosts.

18. The non-transitory computer-readable medium of claim 15 further containing instructions that, when executed by the processor, update the network addresses of the subset of the hosts by initiating forward domain name system resolutions to obtain network addresses for the hostnames of the subset of hosts.

19. The non-transitory computer-readable medium of claim 15 further containing instructions that, when executed by the processor, enforce policy based on a particular hostname to filter data between a client and a server at one of the network addresses associated with the particular hostname.

20. The non-transitory computer-readable medium of claim 15 further containing instructions that, when executed by the processor, enforce policy based on a particular hostname to deny a client access to data at one of the network addresses associated with the particular hostname.

21. The non-transitory computer-readable medium of claim 15 further containing instructions that, when executed by the processor:
  convert at least a portion of the mapping cache into at least a portion of a routing table; and
  load the portion of the routing table into a router.

22. A process comprising:
  storing a mapping cache containing hostname-to-network address data records including hostnames of hosts in association with network addresses and update information, particular update information associated with a particular hostname and a particular network address indicating a priority with which to update the particular network address;
  adding new hostname-to-network address data records, including respective hostnames and network addresses, to the mapping cache based on policy transactions of a policy service capable of enforcing policy, the adding including adding a particular hostname if a client of the policy service is denied access to the particular hostname and adding a particular network address if a client of the policy service is denied access to the particular network address;
  prioritizing a subset of the hosts for update according to a predictive process which determines the update information of a particular hostname-to-network address data record based on a frequency of past changes to network addresses of the particular hostname-to-network address data record;
  updating the network addresses of the subset of the hosts; and
  using the mapping cache to enforce policy.

* * * * *